United States Patent [19]

Kunstmann

[11] Patent Number: 4,852,718

[45] Date of Patent: Aug. 1, 1989

[54] CONVEYOR SYSTEM

[75] Inventor: Uwe Kunstmann, Robdorb, Fed. Rep. of Germany

[73] Assignee: Carl Schenck AG, Fed. Rep. of Germany

[21] Appl. No.: 114,208

[22] Filed: Oct. 28, 1987

[30] Foreign Application Priority Data

Feb. 5, 1987 [DE] Fed. Rep. of Germany ..... 87101561

[51] Int. Cl.$^4$ ............................................. B65G 37/00
[52] U.S. Cl. ................................. 198/465.3; 198/779
[58] Field of Search ................. 198/779, 463.5, 465.3, 198/469.1, 474.1, 476.1, 477.1, 801, 802, 817, 845, 803.2

[56] References Cited

U.S. PATENT DOCUMENTS

| 722,689 | 3/1903 | Frink et al. | 198/779 |
| 1,197,145 | 9/1916 | Olson | 198/802 X |
| 1,768,482 | 6/1930 | Koch | 198/802 X |
| 2,687,796 | 8/1954 | Keesling | 198/801 X |
| 3,174,616 | 3/1965 | Sloan | 198/801 |

FOREIGN PATENT DOCUMENTS 2210341 9/1972 Fed. Rep. of Germany ...... 198/779
7728979 3/1979 Fed. Rep. of Germany .
6705459 10/1968 Netherlands .................... 198/779

Primary Examiner—Frank E. Werner
Assistant Examiner—Cheryl L. Gastineau
Attorney, Agent, or Firm—Connolly and Hutz

[57] ABSTRACT

In a process for the transportation and accumulation of pallets, guide or retaining rollers are arranged on a traction element on an axle. Elastic guiding of the support and retaining rollers in relation to the traction element is accomplished and elastic centering in relation to the traction element results in a straight line operation with conveyors used for the transportation of pallets and large area objects. Reduced maintenance and wear, reduction of noise level of the conveying equipment, prevention of acceleration and braking jolts to the goods to be conveyed and assured parallel guiding of conveyor belts are advantageous of the present invention. Clear centering of the support rollers and of the retaining rollers in relation to the conveyor is also obtained with a device for the transportation and accumulation of pallets as a result of a lagging of the retaining rollers and support rollers behind the axle mount therefor.

8 Claims, 3 Drawing Sheets

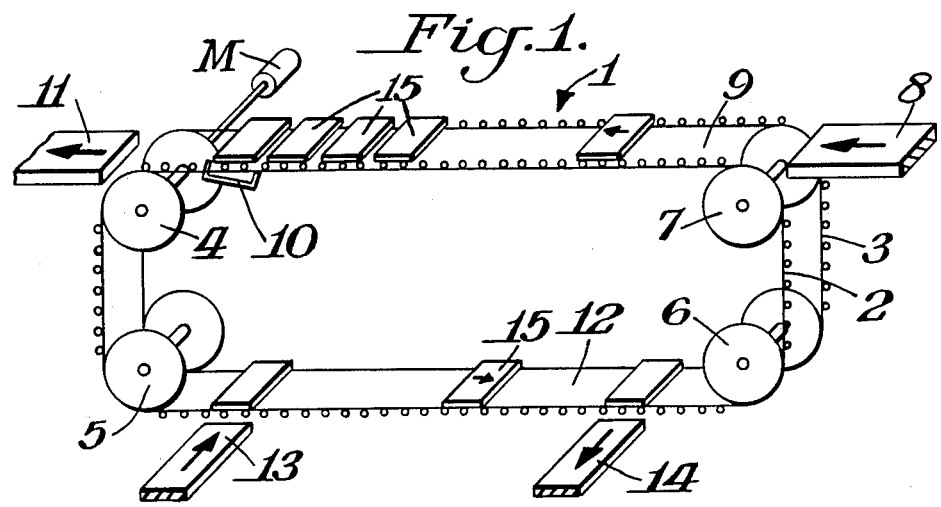
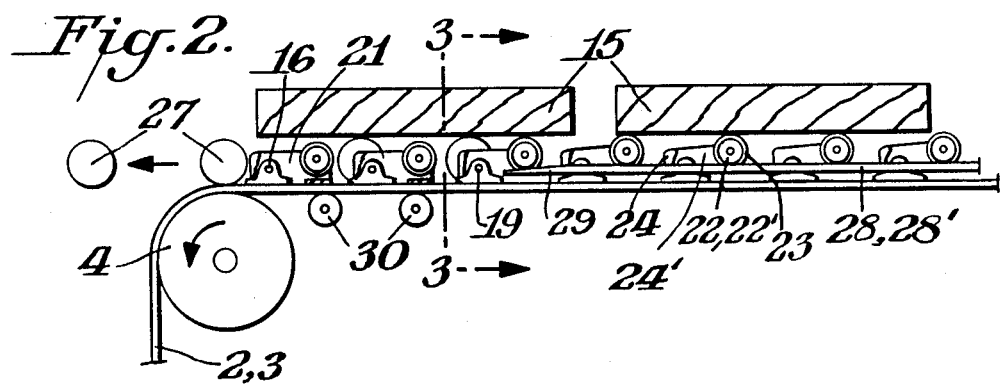
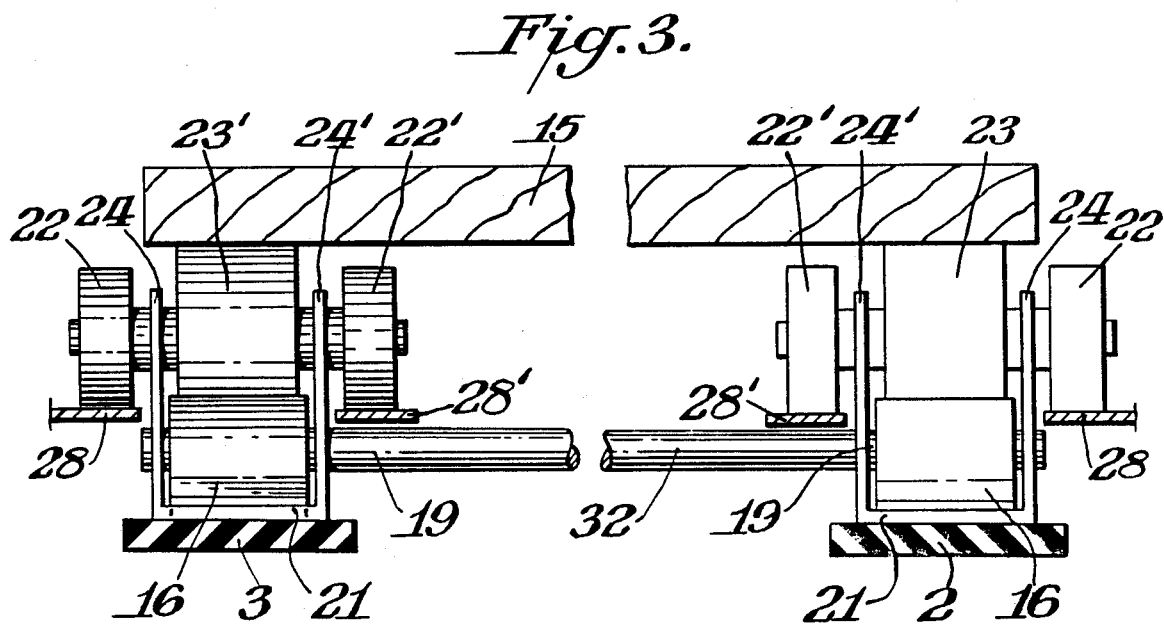

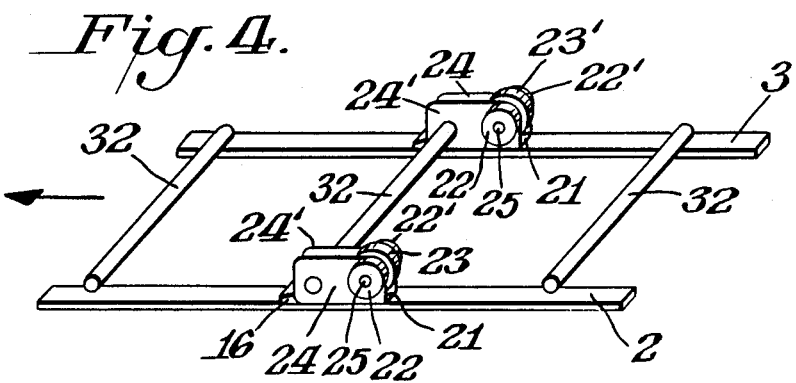
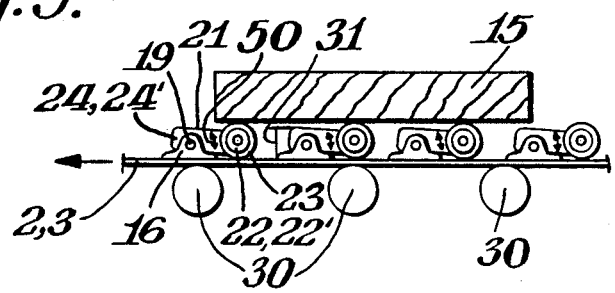
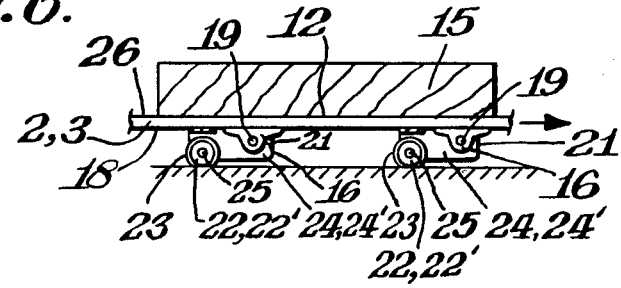
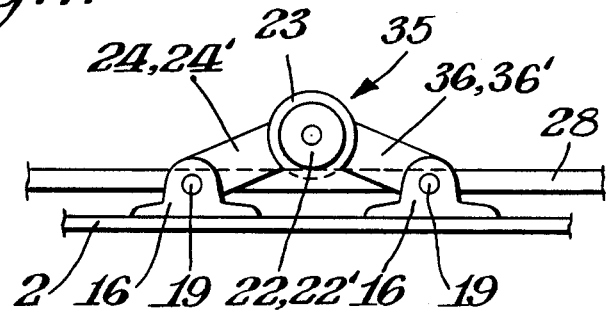

CONVEYOR SYSTEM

BACKGROUND OF THE INVENTION

The invention relates to a process for the transportation and accumulation of pallets, having guide rollers and retaining rollers arranged on a traction element on an axle.

Retaining roller chains have been disclosed in German Utility Patent No. 7 728 979, which as a rule are arranged parallel next to each other in two lines whereby support rollers are each time arranged freely rotatable on the bushings of the roller chains. The bolts of the roller chain laterally project on both sides from the chain and carry bearing bushings which ride on correspondingly arranged rail surfaces. The support rollers in turn do not rest on any guide or support surface but are suspended freely rotatable. The chains are generally endless and are driven via suitable driving means. Such retaining roller chains are subject to considerable wear and a uniform and quiet performance cannot be obtained with these chains. When such chains are accelerated or braked, jolts occur which are even more pronounced when the chain is worn. Moreover, a polygonal effect occurs with such retaining roller chain or support chain conveyors during the rotation of the conveyor chain around the drive or guide pulleys which leads to wear thereof. In addition, these roller chains must absorb the weight of the transported object as well as the tractive force so that the wear of such roller chains increases.

Efforts have been made to reduce these problems. In a result of one a hose is filled with and emptied of fluid in the horizontal area of such a roller chain so as to not stress the chain with the transported weight since this weight is transmitted via the support rollers to the bearing surfaces and the hose but to only use this arrangement to transmit the tractive force. But the wear near the guides between the advancing and reversing track of such a roller chain continues and, in addition, a device which can be filled with and emptied of fluid must be provided. Also such a roller chain which can be used as a support chain conveyor or as a retaining roller conveyor and in which generally a pair of these roller conveyors next to each other form a roller conveyor requires a frequent lubrication of the chain components. If such roller chains are combined to conveying lengths and retaining roller conveyors as a result of a parallel arrangement, considerable cost regarding the synchronization of the two parallel-running chains cannot be avoided. Because of the occurring wear, an alignment of the support elements with the traction elements is only possible at the expense of additional wear.

SUMMARY OF THE INVENTION

On this basis, the objective of the invention for such hauling tracks used for the transportation of pallets and large area objects is to considerably reduce the maintenance and wear, and to reduce the noise level of the conveyor equipment. Other objects include simultaneously prevention of acceleration and braking jolts to the goods to be conveyed with an assured parallel operation of a pair of conveyor belts. The elastic guiding of the support rollers and retaining rollers by the traction element and their elastic centering in relation to the traction element provides for a straight performance so that wear as a result of an askew running to the support roller or of the retaining roller in relation to the traction element does not occur.

A device for the transportion and accumulation of pallets with support rollers is arranged on a traction element on an axle and a retaining roller is arranged in-between. An axle mount is installed on conveyor belts in particular, by means of gluing on the top of the conveyor belt. A roller mount supports the retaining roller and support rollers and the roller mount lags behind the axle mount. Side walls of the rollers and the roller mount are rotatably connected with the axle mount and function as holding brackets for the roller mounts. A distinct centering of the support rollers and the retaining rollers in relation to the conveyor belt is attained because the roller mount lags behind the axle mount. The retaining roller conveyor includes belt rails above the conveyor for the support rollers. Engagement jolts as a result of skewing of the roller mount in relation to the conveyor belt which happens with roller chain conveyors, especially in the spread-out state, cannot occur. The conveyor belt per se is a rubber belt reinforced with steel cables or a rubber or plastic belt reinforced with fiber glass cords. Textile or polyamide fabrics may also be used as reinforcements.

An arrangement of elastic side walls which may consist of flexible steel braces encased in plastic or of elastic plastics provided with reinforcements are rotatably connected with the axle mounts. The constructive concept is side walls which meet at an obtuse angle near the axle. The side walls are preferably made in one piece and provide for the absorption of the stresses occurring as a result of the movement of the conveyor around drive or guide pulleys.

An arrangement of rods connect the two conveyor belts together without additional mechanical expenditure. This provides for the protection of a parallel guiding of the conveyor belts arranged in pairs to a retaining and/or conveying length.

The support rollers or the retaining rollers per se according to the invention serve as a riding support in the reversing track of the retaining and/or conveying length so that a considerable friction reduction is obtained in the reversing track of the conveyor belt according to the invention.

Also proposed is an arrangement of guide bars on the roller mounts. This is especially advantageous when large width retaining rollers and support rollers are connected according to the invention with a narrow conveyor belt and when the support rollers over the entire loop are conducted on guide rails on the inside of which the guide bars according to the invention can center themselves.

The retaining roller may stop during the conveying operation and serve as a support roller. In a retaining length of the endless conveyor belt where the support rollers are running on rails of which the distance to the conveyor belt is greater than the radius of the retaining roller, the retaining roller rides against the accumulated components, for example, the bottom of an accumulated pallet or of a large area component.

Another refinement of the conveyor belt according to the invention includes support and retaining rollers which are used especially in the jolt-free transfer of conveyed goods from a retaining roller conveyor to a roller conveyor or the vice versa. In this case, the continuing roller conveyor is located between the parallel lines of the retaining and/or conveying equipment so that with the same directional drive of the retaining conveyor and the subsequent conveyor as a result of the dipping down retaining roller, a jolt-free transfer of the pallet or of the large area conveyed goods to the roller conveyor can be carried out.

In the reversing track, the support or retaining rollers support the conveyor belt, and the new flat surface can be utilized according to the invention for the transportation of conveyed goods. This is especially advantageous when the difference in height between advancing and reversing tracks is so great that intermediate floors on which operators or robots work on the components on the pallets transported on the advancing track of the retaining roller can be inserted. In this case, the track reversing in another plane can be utilized as a smooth surface conveyor belt.

BRIEF DESCRIPTION OF THE DRAWING

Novel features and advantages of the present invention in addition to those noted above will become apparent to those skilled in the art from a reading of the following detailed description in conjunction with the accompanying drawing wherein similar reference characters refer to similar parts and in which:

FIG. 1 is perspective view of a roller conveyor, according to the present inventions illustrating the upper advancing track and the lower reversing track thereof;

FIG. 2 is an enlarged partial front elevational view of the upper advancing track of the roller conveyor shown in FIG. 1;

FIG. 3 is a cross sectional view taken along lines 3—3 of FIG. 2;

FIG. 4 is a partial perspective view of the conveyor belts and connecting rods of the roller conveyor of FIG. 1;

FIG. 5 is a partial front elevational view of another embodiment of the invention wherein the retaining rollers are pressed against the conveyor belts;

FIG. 6 is an enlarged partial front elevational view of the lower reversing track of the roller conveyor shown in FIG. 1;

FIG. 7 is a partial front elevational view of a modified roller mount for a conveyor, according to the present invention;

DETAILED DESCRIPTION

Figure 8:
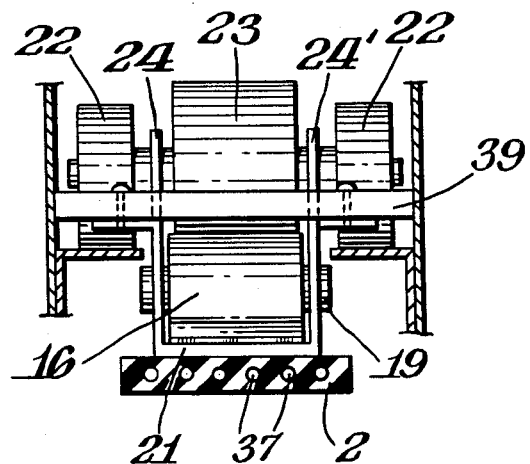
FIG. 8 is a partial cross sectional view similar to FIG. 3 but illustrating a modified conveyor belt with support and retaining roller.

Referring in more particularity to the drawing, FIG. 1 shows an endless conveyor 1 consisting of two conveyor belts 2, 3 arranged parallel to one another, according to the present invention. The conveyor belts are driven by a drive station 4 and trained around a path of travel via guides 5, 6 and 7.

From an input station 8 which may be a roller conveyor or a conveying vehicle such as a lift truck or a suspended monorail, the pallets or large containers loaded with components to be transported and accumulated are transferred to an advancing track 9 of the endless conveyor 1. At the end of the advancing track 9, a separating device 10 is provided where the accumulated transport components are removed according to information from an output conveyor 11. The output conveyor 11 may also be a conveyor of the type mentioned above in connection with the input station 8.

Between the drive station 4 and the guide 5, the endless conveyor is guided in a vertical direction and then in a horizontal direction. The lower horizontal run comprises a lower deck or reversing track 12 of the endless conveyor 1 and such reversing track is utilized as a continuous conveyor for goods arriving via input 13 and goods being removed via output 14. The refinement of the conveyor belts 2 and 3 according to the invention is shown in other Figures of the drawing and described below.

For example, as shown in FIG. 6, a conveying unit 15 is transported on the reversing track 12 of the conveyor belts 2, 3. For this purpose, the conveyor belts 2, 3 are provided with elastic rubber axle mounts 16 fastened on top sides 18 thereof to the belts. The fastening of the elastic rubber axle mounts 16 on the lower surface 18 of the conveyor belts 2,3 can take place by gluing or vulcanizing. The elastic rubber axle mounts 16 are laterally connected via bolts 19 with roller mounts 21 which in turn carry a pair of support rollers 22, 22', as shown best in FIG. 3. Retaining rollers 23, 23' are arranged between the support rollers 22, 22'. The roller mount 21 is connected via the bolts 19 with the axle mount 16 by means of side walls 24, 24' so that the roller mounts 21 are rotatably connected with the axle mount 16. For the sake of simplicity, the front side walls 24' of the roller mounts 21 are not shown in some of the figures of drawing so that only the rear side walls 24 can be seen. The support rollers 22, 22' are preferably arranged on the left and right of the side walls 24 and 24', respectively, while the retaining roller 23 is arranged between the side walls 24, 24'. The support rollers 22, 22' and the retaining roller 23 are mounted on one shaft 25.

As also shown in FIG. 6, the roller mount 21 with its side walls and its support rollers and the retaining roller each lag behind the axle mount 16. As a result of this arrangement and according to the invention, an elastic guiding of the support and retaining rollers by the traction element is guaranteed and also an elastic centering in relation to the traction element is possible.

FIG. 6 also shows that the conveyor belts 2, 3 are rollably supported over a substrate via the retaining rollers 23 or the support rollers 22, 22', and as a continuous conveyor the belts carry conveying units 15. Rolling support via the retaining rollers 23 may involve the floor on which the conveyor belts 2, 3 run. In the case of support via the support rollers 2, 22', U-shaped rails may be set into the floor over which the conveyor belts 2, 3 are returned to the advancing track 9.

In the exit transfer station shown in FIG. 2, a continuing conveyor 27 is supported conveyor belts 2, 3. The conveying units 15 are first carried by the retaining rollers 23 while the support rollers 22, 22' rest on bearing rails 28, 28' which are arranged parallel to the conveyor belts 2, 3 but at a certain distance above the belts. As a result of the rotatability of the roller mount 21 with its side walls 24, 24' about the bolts 19, the conveying units 15 are transported at a height above the conveyor belt 2, 3 which essentially corresponds to the height of the rollers in the continuing conveyor 27. Near the transfer from conveyor belt to continuing conveyor 27, the bearing rails 28, 28' are downwardly tapered at 29 or are conceived inclined so that, on one hand, the jolt-free transfer of the conveyed units to the continuing conveyor 27 is guaranteed and, on the other, the elastic guiding of the support and retaining rollers as well as their centering by the traction element are guaranteed. The conveyor belts 2, 3 are supported in the advancing track via support rollers 30 and returned via the drive station 4 to the reversing track. For the sake of simplicity, axle mounts 16 and roller mounts 21 near the drive station and the reversing track are not shown in FIG. 2.

Another refinement of the invention is shown in FIG. 5. The conveyor belts 2, 3 run over support rollers 30 in the direction of the arrow. The belts carry the support rollers 22, 22' guided via axle mounts in roller mounts 21 and the retaining rollers 23. The roller mounts 21 are rotatably connected with bolts 19 to the side walls 24, 24', as shown by the double arrows 50. When a conveying unit 15 is now supplied to the conveyor belts 2, 3 via an input station, such as station 8 in FIG. 1, it is supported on the retaining rollers 23. As a result of the diameter of the retaining roller 23 which is slightly larger than the height 31 of the side walls 24, 24', the retaining roller 23 per se is lightly pressed against the top of the conveyor belts 2, 3 so that it cannot rotate. If the conveyor length contains a retaining length, rails (not shown) are arranged above the conveyor belts against which the support rollers 22, 22' run. As a result of the rotatability about the bolts 19, the roller mount is lifted, and the retaining roller comes free from the top of the conveyor belts 2, 3. While the conveying unit 15 is held, the conveyor belts 2, 3 are transported further as a result of the retaining rollers 23 riding on the bottom of the conveying unit 15.

FIG. 4 shows a connection of two conveyor belts 2,3 according to the invention by means of rods 32 which at the same time, as replacement for the bolts, connect the axle mounts 16 with the side walls 24, 24' of an opposed pair of roller mounts 21. In this case, the support rollers 22, 22' are arranged outside of the side walls 24, 24' while the retaining rollers 23 are arranged inside the side walls 24, 24'. The support rollers and retaining rollers are connected via a shaft 25. As a result of the large number of rods 32 which connect each pair of axle mounts 16 and each pair of roller mounts including the side walls, a very rigid coupling of conveyor belt 2 and conveyor belt 3 is produced so that expensive straight and synchronized guides for the two conveyor belts are unnecessary.

The modified roller mount 35 shown in FIG. 7 on conveyor belt 2 is connected by means of two bolts 19 between two axle mounts 16 via its side walls 24, 24', on one hand, and via side wall extensions 36, 36', on the other. The side walls 24, 24' and the side wall extensions 36, 36' are produced in one piece from elastic material so that—when the conveyor belt 2 is guided around drive units 4 or guide units 5—the produced elongation of the conveyor belt sections between the two axle mounts as a result of the elastic deformation of the side walls and the side wall extensions can be absorbed without a trailing of the retaining roller 23 or the support rollers 22, 22' at the surface of the conveyor belt 2. The rollers run free as a result of an obtuse angle arrangement of the side wall and the side wall extension with each other.

The enlarged representation of FIG. 8 shows a conveyor belt 2 which is reinforced with steel cables 37 and on which the axle mount 16 is enclosed by the side walls 24, 24' of the roller mount 21. Guide bars 39 are also provided on the roller mount 21 which in the exemplified embodiment according to FIG. 8 at the same time assume the guiding of a narrow conveyor belt 2 near a rail guide for the support rollers.

Figure 9:
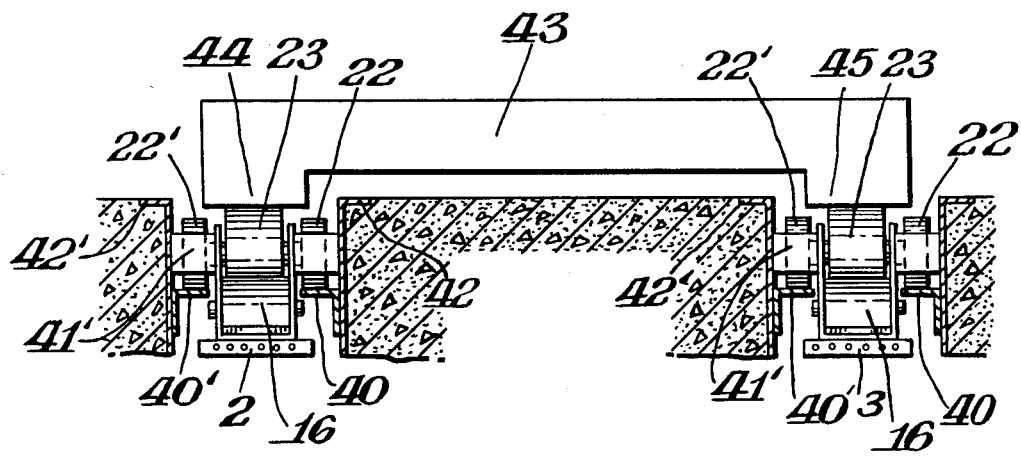
FIG. 9 is a partial cross sectional view similar to FIGS. 3 and 8 but illustrating still another modification of the invention.

The conveyor belts 2, 3 shown in FIG. 9 show a phase of the transportation in which the support rollers 22, 22' run on rails 40, 40' and, therefore, assume the load of the conveying unit carried by the retaining roller 23 so that the conveyor belts 2, 3 only have to produce the elastic traction. In this case, individual guide bars 41, 41' are provided which are centered between the side parts 42, 42' of the rails 40, 40.

FIG. 9 also shows that the side parts 42, 42' with their superstructure project over the conveyor belts 2, 3 so that the conveyor belts 2, 3 run in a channel which is lower than the normal floor surface. On one hand, this provides protection for the conveyor belts 2, 3 and, on the other, U-shaped pallets 43 resting with their short legs 44, 45 on the retaining rollers can be transported close to the floor without the risk that injuries are produced when colliding with objects or people since as a result of the retaining rollers, the conveyed goods immediately stop. This refinement according to the invention of the object of the invention also meets the objective on which the invention is based.

What is claimed:

1. Conveyor apparatus comprising a pair of parallel conveyor belts trained around a plurality of guides for movement along a path of travel, spaced apart elastic rubber axle mounts secured to the conveyor belts, a roller mount rotatably secured to each of the elastic rubber axle mounts and generally extending rearwardly from the mounts, each roller mount having spaced apart generally parallel side walls, support rollers rotatably secured to the roller mount on the outside of the sidewalls thereof, and a retaining roller also rotatably secured to the roller mount but between the side walls thereof, the retaining roller supportingly engaging articles for transport along a path of travel and rotating freely underneath stalled accumulated articles.

2. Conveyor apparatus as in claim 1 wherein the roller mounts on each conveyor belt are transversely opposite the roller mounts on the other belt, and connecting rods transversely extending between opposite roller mounts.

3. Conveyor apparatus as in claim 1 wherein the path of travel of the conveyor belts includes an upper advancing track and a generally parallel lower reversing track.

4. Conveyor apparatus as in claim 1 including guide bars arranged on the roller mounts for guiding the conveyor belts along the path of travel.

5. Conveyor apparatus as in claim 1 wherein each retaining roller has a diameter which extends outwardly of the side walls of the roller mount whereby the retaining roller is slightly higher than the roller mount.

6. Conveyor apparatus as in claim 1 including fixed rails next to the conveyor belts along a portion of the length thereof, the support rollers engaging the rails which are arranged to slightly elevate the retaining roller by rotating the roller mount about its rotational connection to the elastic rubber axle mount, downwardly tapered rail portions at the ends of the rails to effect a lowering of the retaining rollers, and a separate conveyor near the tapered rail portions.

7. Conveyor apparatus comprising a pair of parallel conveyor belts trained around a plurality of guides for movement along a path of travel, spaced apart elastic rubber axle mounts secured to the conveyor belts, roller mounts rotatably secured to the elastic rubber axle mounts, each roller mount having spaced apart generally parallel side walls, support rollers rotatably secured to the roller mount on the outside of the sidewalls thereof, a retaining roller also rotatably secured to the roller mount but between the side walls thereof, the retaining roller supportingly engaging articles for transport along a path of travel and rotating freely underneath stalled accumulated articles, and the side walls of each roller mount including an upwardly angled portion and a downwardly angled portion with a raised middle portion therebetween and an elastic rubber axle mount at each end of each roller mount, and means rotatably securing the ends of each roller mount to the elastic rubber axle mounts.

8. Conveyor apparatus as in claim 7 wherein the roller mounts on each conveyor belt are transversely opposite the roller mounts on the other belt, and connecting rods transversely extending between opposite roller mounts to connect the opposite roller mounts together and also to rotatably connect the side walls of the roller mounts to the elastic rubber axle mounts.

* * * * *